United States Patent
Zhang et al.

(10) Patent No.: US 10,601,060 B2
(45) Date of Patent: Mar. 24, 2020

(54) SYSTEMS AND METHODS TO DETERMINE CATHODE INLET PRESSURE LIMITS IN A FUEL CELL SYSTEM

(71) Applicant: GM GLOBAL TECHNOLOGY OPERATIONS LLC, Detroit, MI (US)

(72) Inventors: Yanyan Zhang, Troy, MI (US); Joseph Mussro, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1314 days.

(21) Appl. No.: 13/909,814

(22) Filed: Jun. 4, 2013

(65) Prior Publication Data
US 2014/0356750 A1    Dec. 4, 2014

(51) Int. Cl.
*H01M 8/04298*    (2016.01)
*H01M 8/04746*    (2016.01)
*H01M 8/04992*    (2016.01)
*H01M 8/04701*    (2016.01)

(52) U.S. Cl.
CPC ... *H01M 8/04753* (2013.01); *H01M 8/04776* (2013.01); *H01M 8/04992* (2013.01); *H01M 8/04298* (2013.01); *H01M 8/04738* (2013.01); *H01M 2250/20* (2013.01); *Y02T 90/32* (2013.01)

(58) Field of Classification Search
CPC ......... H01M 8/04776; H01M 8/04738; H01M 8/04753; H01M 8/04992; H01M 8/04783
See application file for complete search history.

(56) References Cited

U.S. PATENT DOCUMENTS

| | | | | |
|---|---|---|---|---|
| 4,838,202 A | * | 6/1989 | Neu | A01K 1/0107 119/165 |
| 2005/0095474 A1 | * | 5/2005 | Rainville | F04D 27/001 429/444 |
| 2005/0164057 A1 | * | 7/2005 | Pospichal | H01M 8/04089 429/444 |
| 2006/0134472 A1 | * | 6/2006 | Bach | H01M 8/0263 429/413 |
| 2007/0141412 A1 | * | 6/2007 | Becker | H01M 8/04141 429/414 |
| 2007/0184318 A1 | * | 8/2007 | Katano | H01M 8/04007 429/430 |

(Continued)

FOREIGN PATENT DOCUMENTS

| JP | 2009-181925 A | | 8/2009 |
|---|---|---|---|
| JP | 2009181925 A | * | 8/2009 |

OTHER PUBLICATIONS

H. Katsuta, Machine translation for JP 2009-181925 A, Aug. 13, 2009, obtained from Espacenet.com.*
JP 2009-181925A—Machine translation of abstract.

*Primary Examiner* — Jeremiah R Smith
(74) *Attorney, Agent, or Firm* — Quinn IP Law (57) ABSTRACT

System and methods for setting pressure limits for an air supply of a fuel cell ("FC") system are presented. Certain embodiments disclosed herein may allow a FC system to calculate a minimum and a maximum FC stack cathode inlet pressure based on different operating conditions while ensuring that the FC stack receives a desired air flow. Further embodiments disclosed herein may allow a FC system to maintain a cathode inlet air pressure within a range that protects an associated compressor from entering surge and/or overheating conditions.

6 Claims, 7 Drawing Sheets

(56) References Cited

U.S. PATENT DOCUMENTS

| | | | |
|---|---|---|---|
| 2008/0206607 A1* | 8/2008 | Mallavarapu | H01M 8/04089 |
| | | | 429/415 |
| 2009/0032756 A1* | 2/2009 | Lee | G05D 16/208 |
| | | | 251/129.15 |
| 2009/0098426 A1* | 4/2009 | Tsuchiya | H01M 8/0438 |
| | | | 429/425 |
| 2009/0325010 A1* | 12/2009 | Kirklin | H01M 8/04089 |
| | | | 429/413 |
| 2010/0062295 A1 | 3/2010 | Heo | |
| 2011/0086285 A1* | 4/2011 | Chikugo | H01M 8/04089 |
| | | | 429/429 |
| 2012/0315559 A1* | 12/2012 | Noh | B60L 50/72 |
| | | | 429/431 |

* cited by examiner

SYSTEMS AND METHODS TO DETERMINE CATHODE INLET PRESSURE LIMITS IN A FUEL CELL SYSTEM

TECHNICAL FIELD

This disclosure relates to systems and methods for setting pressure limits for an air supply of a fuel cell system. More specifically, but not exclusively, this disclosure relates to systems and methods for determining maximum and minimum inlet air pressure setpoints for a cathode air supply subsystem in a vehicle fuel cell system.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., electric drive motors and the like) and/or via an intermediate battery system. Hydrogen is one possible fuel that may be used in a FC system. Hydrogen is a clean fuel that can be used to efficiently produce electricity in a FC. A hydrogen FC system is an electrochemical device that may include an electrolyte between an anode and a cathode. The anode receives hydrogen gas and the cathode receives oxygen or air. The hydrogen gas is dissociated in the anode to generate free hydrogen protons and electrons. The hydrogen protons may be selectively conducted across the electrolyte. The electrons from the anode cannot pass through the electrolyte, and thus are directed through a load to perform work before being sent to the cathode. The hydrogen protons react with the oxygen and the electrons in the cathode to generate water.

Proton exchange membrane fuel cells ("PEMFC") may be used in FC-powered vehicles. A PEMFC generally includes a solid polymer electrolyte proton conducting membrane, such as a perfluorosulfonic acid membrane. An anode and cathode included in a PEMFC may include finely divided catalytic particles (e.g., platinum particles) supported on carbon particles and mixed with an ionomer. A catalytic mixture may be deposited on opposing sides of the membrane.

SUMMARY

A FC system may include a single cell or, alternatively, may include multiple cells arranged in a stack configuration. A FC stack may receive a cathode input gas, air for example, forced through the stack by a compressor. A FC stack cathode inlet pressure setpoint may be determined by a stack humidification control system to achieve a certain humidification level for the membrane. The humidification level may be maintained to avoid membrane dry out and to help improve FC stack performance and durability. If a cathode inlet air pressure setpoint is too high, a cathode backpressure valve may close and the compressor may run into surge. If a cathode inlet air pressure setpoint is too low, a compressor speed command setting a speed for the compressor system may be inaccurate. A compressor speed command, which may be calculated from a pressure setpoint calculation, may help to maintain a smooth compressor speed control.

Systems and methods are presented for determining minimum and maximum pressure setpoints of a cathode air supply of a FC system. In some embodiments, control parameters for a FC compressor system (e.g., compressor speed commands) may be determined based on the setpoint. Certain embodiments disclosed herein may allow a FC system to calculate a minimum and a maximum FC stack cathode inlet pressure based on different operating conditions while ensuring that the FC stack receives a desired air flow. Further embodiments disclosed herein may allow a FC system to maintain a cathode inlet air pressure range that protects an associated compressor from experiencing surge and/or overheating conditions. In further embodiments, the systems and methods disclosed herein may allow for more accurate compressor speed control and/or smoother compressor operation.

In certain embodiments, a method for setting a maximum FC stack pressure setpoint may include determining a compressor pressure ratio setpoint of a FC compressor system. In some embodiments, determining the compressor pressure ratio setpoint may include determining that a corrected flow rate is larger than a critical mass flow rate of the compressor system and calculating the setpoint based on the corrected flow rate at a maximum speed of the compressor system. In further embodiments, determining the compressor pressure ratio setpoint may include determining that a corrected flow rate is less than a critical mass flow rate of the compressor system and calculating the setpoint based on a temperature limitation of the compressor system. In yet further embodiments, determining the compressor pressure ratio setpoint may be based on a compressor map of the compressor system.

The method may further include determining a predicted compressor inlet pressure of the FC compressor system and determining a predicted pressure drop from an outlet of the FC compressor system to an inlet of the FC. In certain embodiments, the predicted pressure drop may be determined based on a pressure drop model of the compressor and/or FC system. Based on the compressor pressure ratio setpoint, the predicted compressor inlet pressure, and the predicted pressure drop, a maximum FC stack pressure setpoint may be calculated. In certain embodiments, the maximum FC stack pressure setpoint may be calculated by multiplying the compressor ratio setpoint by the predicted compressor inlet pressure and subtracting the predicted pressure drop. Based on the calculated FC stack pressure setpoint, a control parameter (e.g., a compressor speed command) may be adjusted.

In further embodiments, a method for setting a minimum FC stack pressure setpoint may include determining that a compressor valve is open at a desired stack flow. If the compressor valve is open, a predicted stack inlet pressure may be determined based on a pressure drop model associated with the compressor system. A minimum FC stack pressure setpoint may be calculated based on the predicted stack inlet pressure and a control parameter may be adjusted based on the calculated minimum FC stack pressure setpoint.

In yet further embodiments, a method for setting a minimum FC stack pressure setpoint may include determining a predicted cathode exhaust inlet pressure. In certain embodiments, the predicted cathode exhaust inlet pressure may be determined according to a pressure drop model based on a stack flow setpoint, a flow temperature, and/or an ambient pressure. A predicted cathode backpressure valve inlet pressure may be determined according to a pressure drop model based on the stack flow setpoint, the flow temperature, the predicted cathode exhaust inlet pressure, and/or a position of a backpressure valve. A pressure drop model based on the stack flow setpoint, the flow temperature, and/or the predicted cathode backpressure valve inlet pressure may be used to calculate a minimum FC stack pressure setpoint for the FC system. Based on the calculated FC stack pressure setpoint, a control parameter of the FC system may be adjusted.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Figure 1:
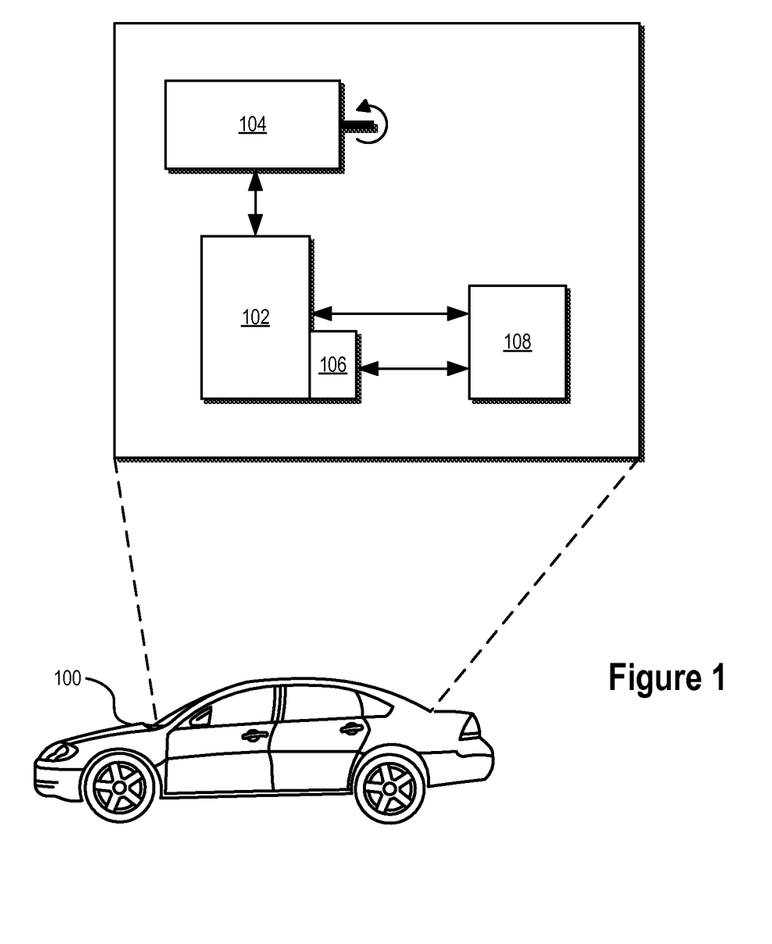
FIG. 1 illustrates a functional block diagram of an exemplary system for measuring operating parameters of a FC system in a vehicle consistent with embodiments disclosed herein.

FIG. 1 illustrates an example of a FC system 102 in a vehicle 100 consistent with embodiments disclosed herein. The vehicle 100 may be a motor vehicle, a marine vehicle, an aircraft, and/or any other type of vehicle, and may include any suitable type of drivetrain for incorporating the systems and methods disclosed herein. Additional embodiments may apply the teachings of the present disclosure to stationary power sources (e.g., generators). As illustrated, vehicle 100 may include a FC system 102 configured to provide electrical power to certain components of the vehicle 100. For example, FC system 102 may be configured to provide power to electric drivetrain components 104 of the vehicle 100. The FC system 102 may include a single cell or multiple cells arranged in a stack configuration, and may include certain FC system elements and/or features described above.

As illustrated, the FC system 102 may be configured to directly provide power to electric drivetrain components 104. In certain embodiments, the FC system 102 may be configured to provide power to electric drivetrain components 104 via an intermediate battery system (not shown). In further embodiments, the FC system 102 may be configured to provide power to one or more other battery systems (not shown) including low voltage battery systems (e.g., lead-acid 12V automotive batteries) that supply electric energy to a variety of vehicle 100 systems including, for example, vehicle starter systems (e.g., a starter motor), lighting systems, audio systems, and/or the like.

An air circulation system 106 may be coupled to the FC system 102 and be configured to circulate air through one or more locations in the FC system 102. In some embodiments, the air circulation system 106 may comprise a cathode air supply system. The air circulation system 106 may comprise any suitable number of compressors, pumps, valves, circulation paths (e.g., piping), reservoirs, heat exchangers, air circulation system electronics (e.g., feedback mechanisms, temperature sensors, thermostats, air flow sensors, compressor electronics, air pressure sensors, and/or the like), and/or any other air circulation system component and/or system in any suitable configuration for circulating air to various components and systems included in the FC system 102.

The FC system 102 and/or the air circulation system 106 may be communicatively coupled with an associated a FC control system 108. The FC control system 108 may be configured to monitor and control certain operations of the FC system 102, the air circulation system 106, and/or other associated systems. For example, the FC control system 108 may be configured to monitor and control operations of the FC system 102. Further, the FC control system 108 may be configured to monitor and/or control a compressor system included in the air circulation system 106. For example, the FC control system 108 may be configured to monitor and/or control pressure limits and/or setpoint of the air circulation system 106. In further embodiments, an internal vehicle computer system (not shown) and/or any other suitable computer system may be configured to monitor and control certain operations of the FC system 102 and/or the air circulation system 106.

In certain embodiments, the FC control system 108 may be communicatively coupled with one or more sensors (not shown) associated with the air circulation system 106 including, for example, air flow sensors, pressure sensors, backpressure valve position sensors, and/or any other suitable sensor or sensors that may provide information utilized in the systems and methods disclosed herein. In certain embodiments, the one or more sensors may provide information used in calculating and/or adjusting one or more cathode inlet pressure setpoints (e.g., minimum and/or maximum pressure limits and/or setpoints).

In certain embodiments, the FC control system 108 may further be configured to provide and/or receive other information to/from the air circulation system 106. Such information may include, without limitation, backpressure valve position information, compressor speed information, air flow information, and/or any other relevant information. In some embodiments, the FC control system 108 may be communicatively coupled with an internal vehicle computer system (not shown) and/or an external computer system (e.g., via a wireless telecommunications system or the like). In certain embodiments, the FC control system 108 may be configured, at least in part, to provide information regarding the FC system 102 to a vehicle computer system and/or an external computer system.

Certain embodiments disclosed herein may allow the FC control system 108 to calculate a minimum and a maximum FC system 102 cathode inlet pressure based on different operating conditions while ensuring that the FC system 102 receives a desired air flow. Further embodiments disclosed herein may allow the FC control system 108 to maintain a cathode inlet air pressure within a range that protects an associated compressor from entering surge and/or overheating conditions.

Figure 2:
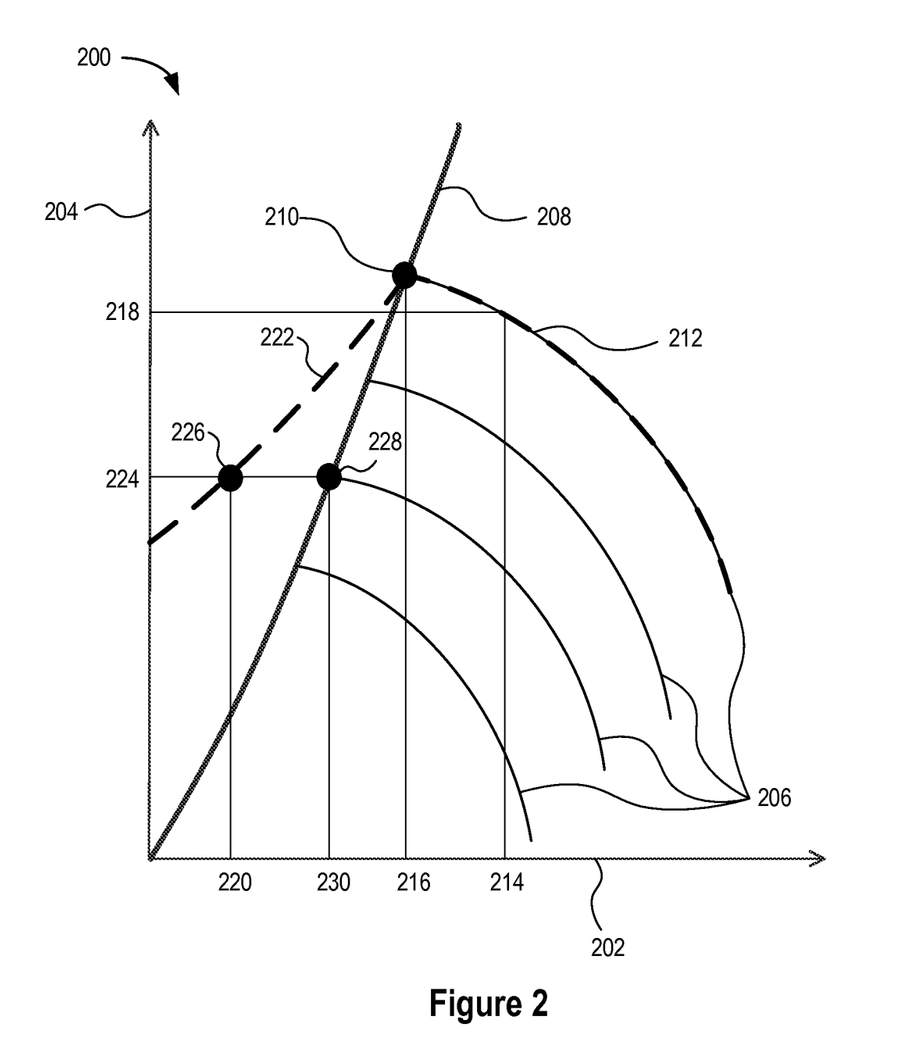
FIG. 2 illustrates an exemplary compressor map that may be used to determine a maximum compressor ratio of an FC system consistent with embodiments disclosed herein.

FIG. 2 illustrates an exemplary compressor map 200 that may be used to determine a maximum compressor ratio of an FC system consistent with embodiments disclosed herein. In certain embodiments, the compressor map 200 may be associated with a compressor of an air circulation system including an FC cathode inlet air supply system. The axis 202 represents a corrected compressor air flow and axis 204 represents a pressure ratio across the compressor. Map 200 further illustrates iso-speed lines 206 and a surge line 208 for the associated compressor system.

Consistent with embodiments disclosed herein, a maximum FC stack pressure setpoint may be calculated from a maximum compressor pressure ratio setpoint of a FC compressor system. In some embodiments, the setpoint may calculated according to Equation 1:

$$(\text{MaxCompRatioSP} * \text{CompinletPressureSP}) - \text{PredPressDrop} \quad (1)$$

where MaxCompRatioSP is the maximum compressor ratio setpoint, CompinletPressureSP is the predicted compressor inlet pressure, and PredPressDrop is the predicted pressure drop from the compressor outlet to the FC stack inlet.

Point 210 illustrated in FIG. 2 may represent the intersection of a maximum speed line 212 and a surge line 208 of the compressor map 200. This intersection may be associated with a maximum pressure ratio that can be achieved by the compressor associated with the compressor map 200. A corrected flow 214 may be calculated from a stack flow setpoint. If the corrected flow 214 is larger than a critical mass flow 216, the maximum compressor ratio setpoint 218 may be determined by the corrected flow 214 and the maximum compressor speed 212, which is the pressure ratio corresponding to the maximum speed at the flow rate.

If the corrected flow is less than the critical mass flow 216, for example at 220, the maximum compressor ratio setpoint 224 may be determined by the temperature limitation of the compressor. In certain circumstances, a corrected flow 220 and associated compressor ratio setpoint 224 will result in an operating condition point 226 that falls into the surge region on the compressor map 200, indicating that the a compressor may run into surge. To avoid a compressor surge, the operating condition of the compressor may be set to point 228, which may represent the maximum pressure ratio setpoint 224 at a corrected flow 230. This may, however, result in the compressor overheating and, accordingly, in this region the maximum pressure ratio setpoint may be determined by compressor over temperature protection variables.

The final maximum compressor ratio setpoint used in setting control parameters of the compressor system may be described by the dashed line 222 illustrated in the compressor map 200 of FIG. 2. Line 222 to the left of 216 may be associated with a thermal limitation of the compressor, and line 222 to the right of 216 may be associated with the maximum compressor speed line 212. Once a compressor pressure ratio setpoint is determined, a maximum FC stack pressure setpoint may be determined based on a maximum compressor outlet pressure and the pressure drop from an outlet of the FC compressor system to an inlet of a FC stack. The pressure drop may be determined by using a pressure drop model.

Figure 3:
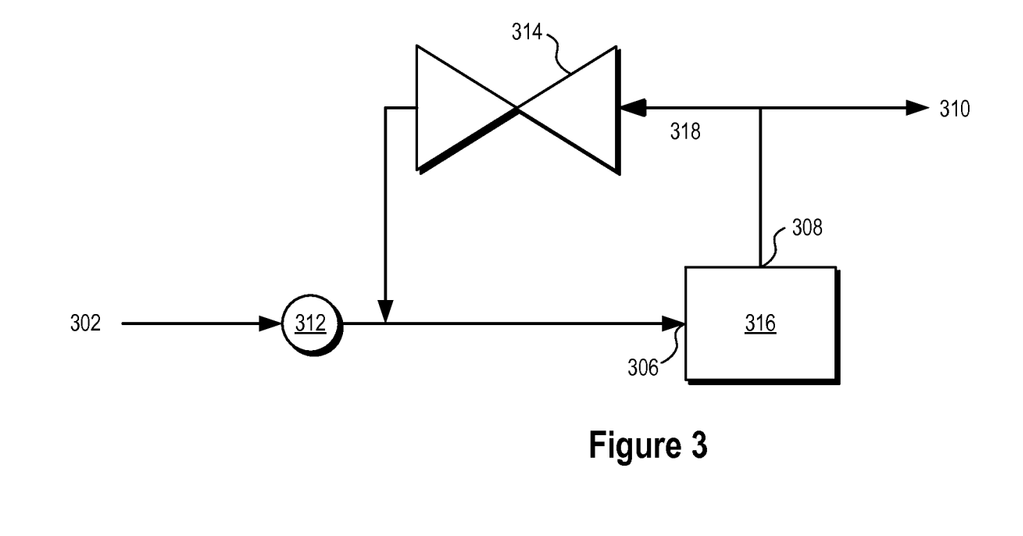
FIG. 3 illustrates a conceptual flow diagram of a compressor air recirculation flow pass system of a FC system consistent with embodiments disclosed herein.

FIG. 3 illustrates a conceptual flow diagram of a compressor air recirculation flow pass system of a FC system consistent with embodiments disclosed herein. As discussed above, a maximum compressor ratio setpoint may be determined based, at least in part, on a FC stack flow. For example, if an air flow 302, which may be measured by an air flow sensor 312 is below a threshold flow rate (e.g., a critical flow rate), the compressor pressure ratio setpoint may be calculated based on a temperature limitation of the FC compressor system 316. In this circumstance, to mitigate the potential for the compressor system 316 from running into a surge condition, the compressor system 316 may be controlled to have a higher air flow. A recirculation valve 314 may allow a portion of an air flow 318 from a compressor output 308 to be recirculated into the air flow provided to the compressor input 306. The remaining airflow 310 may be provided to the FC stack. Air flow through the recirculation valve 314 may result in a higher air flow temperature at compressor inlet 306, which may cause a higher air flow temperature at a compressor outlet 308. Such conditions may cause the compressor system 316 to overheat. Accordingly, under such conditions, the maximum compressor pressure ratio setpoint may be determined based on compressor over temperature protection variables.

Figure 4:
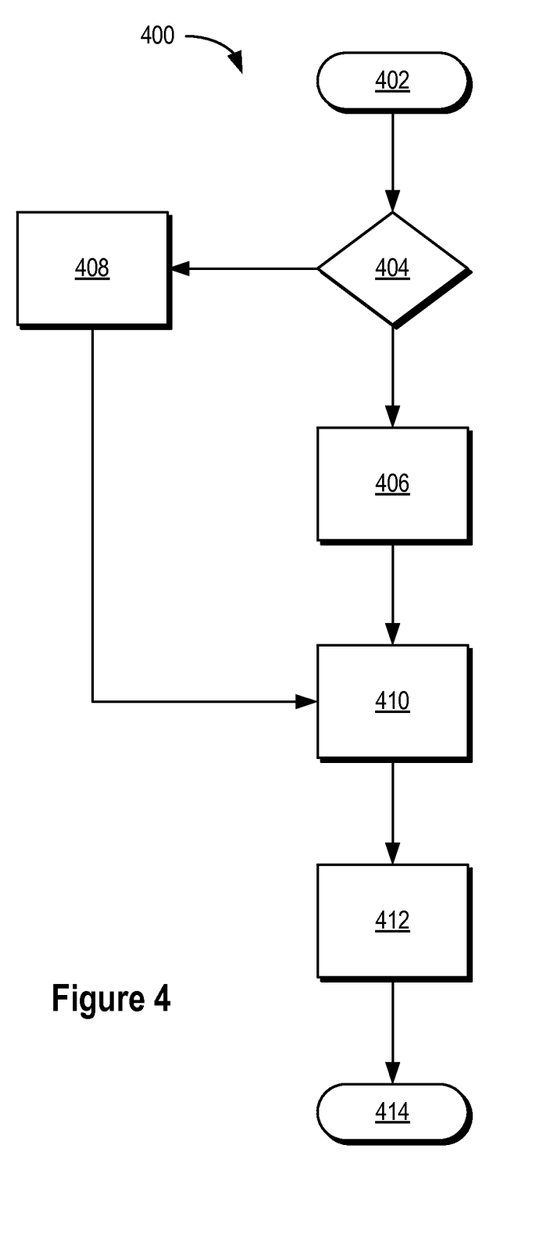
FIG. 4 illustrates a flow chart of an exemplary method to determine a maximum pressure setpoint for a FC stack consistent with the embodiments disclosed herein.

FIG. 4 illustrates a flow chart of an exemplary method 400 to determine a maximum pressure setpoint for a FC stack consistent with the embodiments disclosed herein. The illustrated method 400 may be performed using, at least in part, a vehicle computer system, an external computer system, a FC control system, and/or any other suitable system.

The method 400 may begin at 402. At 404 a corrected flow rate may be calculated from a measured flow rate and be compared to a critical flow rate. If the corrected flow rate is higher than the critical flow rate, the method may proceed to 408. At 408 a calculation may be performed to determine the maximum compressor pressure ratio setpoint based on the corrected flow rate and a maximum compressor speed, as detailed above. If, however the corrected air flow rate is less than the critical flow rate, the method may proceed to 406. At 406 the maximum compressor pressure ratio setpoint may be calculated based on a temperature limitation of the FC compressor system.

After the compressor pressure ratio setpoint is determined, either at 406 or 408, the method may proceed to 410. At 410 the FC stack pressure setpoint may be calculated using a compressor pressure ratio setpoint of a FC compressor system, a predicted compressor inlet pressure of the FC compressor system, and a predicted pressure drop from an outlet of the FC compressor system to an inlet of the FC. After a FC stack pressure setpoint is determined the process may move to 412, where a FC system may adjust a control parameter of a FC compressor system based on a calculated FC stack pressure setpoint. The method may then proceed to terminate at 414.

Figure 5:
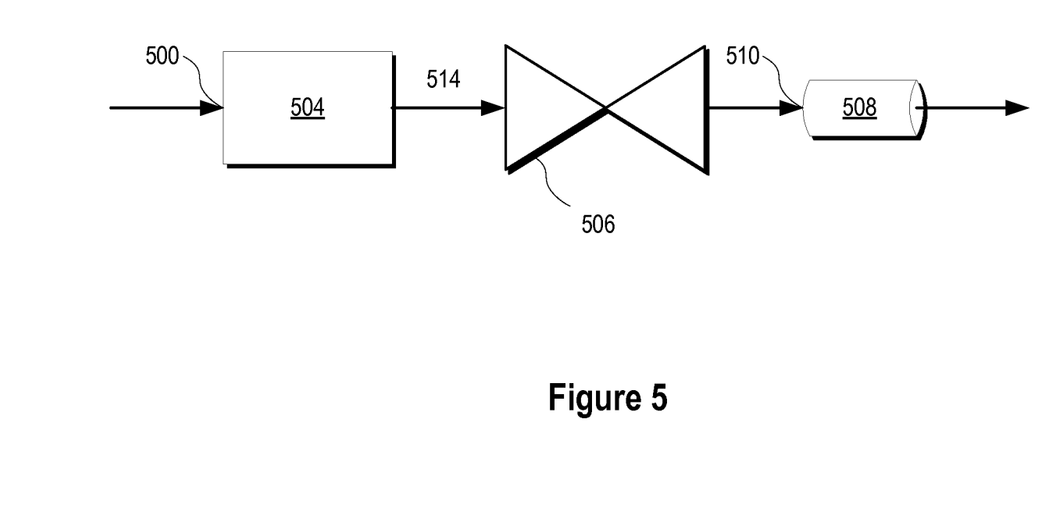
FIG. 5 illustrates a conceptual flow diagram of a cathode air supply system of a FC system consistent with embodiments disclosed herein.

FIG. 5 illustrates a conceptual flow diagram of a cathode air supply system of a FC system consistent with embodiments disclosed herein. The diagram includes a FC stack 504, a backpressure valve 506, and a cathode exhaust 508. As discussed above, in certain embodiments, a lower limit of the pressure at a stack inlet 500 may be determined based on a maximum open position of the backpressure valve 506. For example, if the valve 506 is fully open at a desired stack flow, the predicted pressure at the stack inlet 500 calculated from a pressure drop model may be the minimum value of the stack pressure setpoint.

The pressure at a cathode exhaust inlet 510 may be calculated using a pressure drop model based on the stack flow setpoint, flow temperature, and/or an ambient pressure. The cathode backpressure valve inlet pressure 514 may be calculated based on a valve pressure drop model based on the stack flow setpoint, flow temperature, the predicted cathode exhaust inlet pressure 510, and the backpressure valve 506. Finally the minimum stack pressure setpoint may be calculated by using a pressure drop model based on the stack flow setpoint, flow temperature, and/or the predicted cathode backpressure valve inlet pressure 514.

Figure 6:
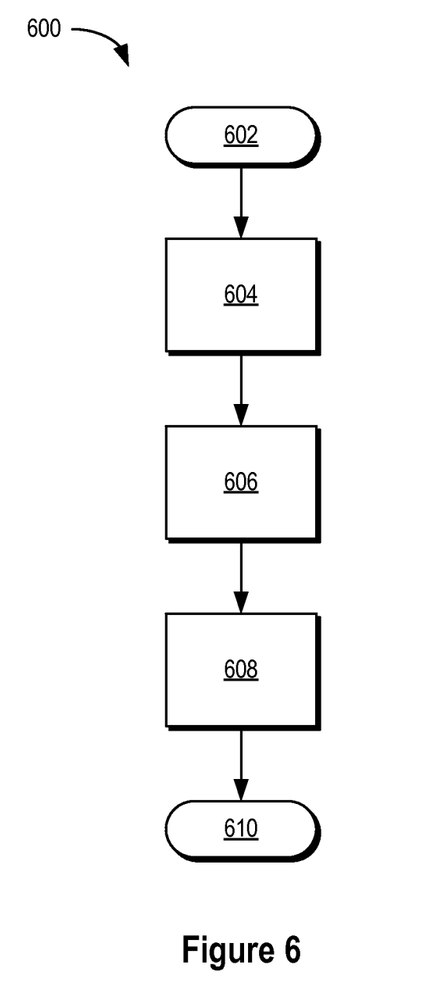
FIG. 6 illustrates a flow chart of an exemplary method to determine a minimum pressure setpoint for a FC stack consistent with the embodiments disclosed herein.

FIG. 6 illustrates a flow chart of an exemplary method 600 to determine a minimum pressure setpoint for a FC stack consistent with the embodiments disclosed herein. The illustrated method 600 may be performed using, at least in part, a vehicle computer system, an external computer system, a FC control system, and/or any other suitable system. The illustrated method 600 may begin at 602. At 604, a predicted cathode exhaust inlet pressure may be calculated using a pressure drop model based on a stack flow setpoint, a flow temperature, and/or an ambient pressure. At 606, a predicted cathode backpressure valve inlet pressure may be determined based on a valve pressure drop model. The valve pressure drop model may be based on a stack flow setpoint, a flow temperature, the predicted cathode exhaust inlet pressure, and/or a position of a backpressure valve. The minimum stack pressure setpoint may be calculated at 608 by using a pressure drop model based on a stack flow setpoint, a flow temperature, and the predicted cathode backpressure valve inlet pressure. The method may proceed to terminate at 610.

Figure 7:
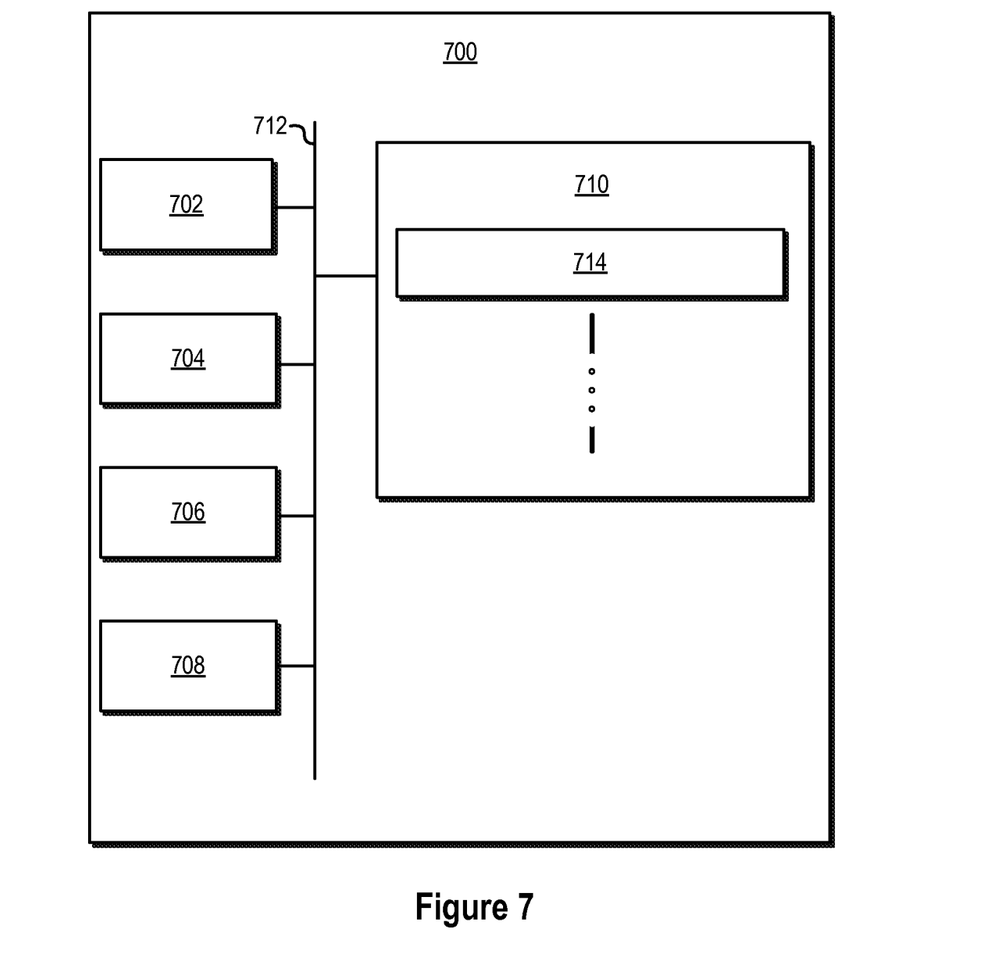
FIG. 7 illustrates a block diagram of an exemplary computer system for implementing various embodiments consistent with embodiments disclosed herein.

FIG. 7 illustrates a block diagram of a computer system 700 that may be utilized in implementing certain embodiments of the systems and methods disclosed herein. In certain embodiments, the computer system 700 may be a personal computer system, a server computer system, an on-board vehicle computer, an FC control system, and/or any other type of system suitable for implementing the disclosed systems and methods. In further embodiments, the computer system 700 may be any portable electronic computer system or electronic device including, for example, a notebook computer, a smartphone, and/or a tablet computer.

As illustrated, the computer system 700 may include, among other things, one or more processors 702, random access memory (RAM) 704, a communications interface 706, a user interface 708, and a non-transitory computer-readable storage medium 710. The processor 702, RAM 704, communications interface 706, user interface 708, and computer-readable storage medium 710 may be communicatively coupled to each other via a common data bus 712. In some embodiments, the various components of the computer system 700 may be implemented using hardware, software, firmware, and/or any combination thereof.

User interface 708 may include any number of devices allowing a user to interact with the computer system 700. For example, user interface 708 may be used to display an interactive interface to a user. The user interface 708 may be a separate interface system communicatively coupled with the computer system 700 or, alternatively, may be an integrated system such as a display interface for a laptop or other similar device. In certain embodiments, the user interface 708 may be produced on a touch screen display. The user interface 708 may also include any number of other input devices including, for example, keyboard, trackball, and/or pointer devices.

The communications interface 706 may be any interface capable of communicating with other computer systems, peripheral devices, and/or other equipment communicatively coupled to computer system 700. For example, the communications interface 706 may allow the computer system 700 to communicate with other computer systems (e.g., computer systems associated with external databases and/or the Internet), allowing for the transfer as well as reception of data from such systems. The communications interface 706 may include, among other things, a modem, a satellite data transmission system, an Ethernet card, and/or any other suitable device that enables the computer system 700 to connect to databases and networks, such as LANs, MANs, WANs and the Internet.

Processor 702 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 702 may be configured to execute computer-readable instructions stored on non-transitory computer-readable storage medium 710. Computer-readable storage medium 710 may store other data or information as desired. In some embodiments, the computer-readable instructions may include computer executable functional modules 714. For example, the computer-readable instructions may include one or more functional modules configured to implement all or part of the functionality of the systems and methods described above. Specific functional models that may be stored on computer-readable storage medium 710 include a minimum cathode air pressure calculation module, a maximum cathode inlet air pressure calculation module, air flow requirements module, air compressor temperature protection module, and/or a membrane humidity control module.

The system and methods described herein may be implemented independent of the programming language used to create the computer-readable instructions and/or any operating system operating on the computer system 700. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 400 may be in response to user commands, results of previous processing, or a request made by another processing machine. It will be appreciated that computer system 700 may utilize any suitable operating system including, for example, Unix®, DOS, Android®, Symbian®, Windows®, iOS®, OSX®, Linux®, and/or the like.

Although the foregoing has been described in some detail for purposes of clarity, it will be apparent that certain changes and modifications may be made without departing from the principles thereof. For example, in certain embodiments, the systems and methods disclosed herein may be utilized in FC systems not included in a vehicle (e.g., as in back-up power sources or the like). It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
a fuel cell (FC) system comprising a FC stack;
an air circulation system configured to circulate air through one or more locations of the FC system, the air circulation system comprising a FC compressor system;
a FC controller system programmed to:
determine a compressor pressure ratio setpoint of the FC compressor system; determine a predicted compressor inlet pressure of the FC compressor system; determine a predicted pressure drop from an outlet of the FC compressor system
to an inlet of the FC system;
calculate a first stack pressure setpoint of the FC via a mathematical expression using the compressor pressure ratio setpoint, the predicted compressor inlet pressure, and the predicted pressure drop; and
adjust a first control parameter of the FC compressor system based on the calculated first stack pressure setpoint of the FC.

2. The system of claim 1, wherein the first stack pressure setpoint of the FC comprises a maximum stack pressure setpoint of the FC.

3. The system of claim 1, wherein the mathematical expression includes subtracting the predicted pressure drop from a product of the compressor ratio setpoint and the predicted compressor inlet pressure.

4. The system of claim 1, wherein the FC controller system is further programmed to:
determine that a cathode backpressure valve is open at a desired stack flow;
determine a predicted cathode exhaust inlet pressure;
determine a predicted cathode backpressure valve inlet based on the predicted cathode exhaust inlet pressure;
calculate a second stack pressure setpoint of the FC using a pressure drop model; and
adjust a second control parameter of a FC compressor system based on the calculated second stack pressure setpoint of the FC.

5. The system of claim 4, wherein the calculated second stack pressure setpoint of the FC comprises a minimum stack pressure setpoint of the FC.

6. The system of claim 4, wherein the FC controller system is further programmed to prevent the cathode backpressure valve from closing and thereby maintain operation of the FC compressor system outside of compressor surge and facilitate direct correspondence of the adjusted first and second control parameters to respective commanded values of the first and second control parameters by setting stack pressure setpoints between the first and second stack pressure setpoints.

* * * * *